Dec. 15, 1936.    C. M. MacLEOD    2,064,676
ELECTRIC HAND SAW
Filed June 4, 1935
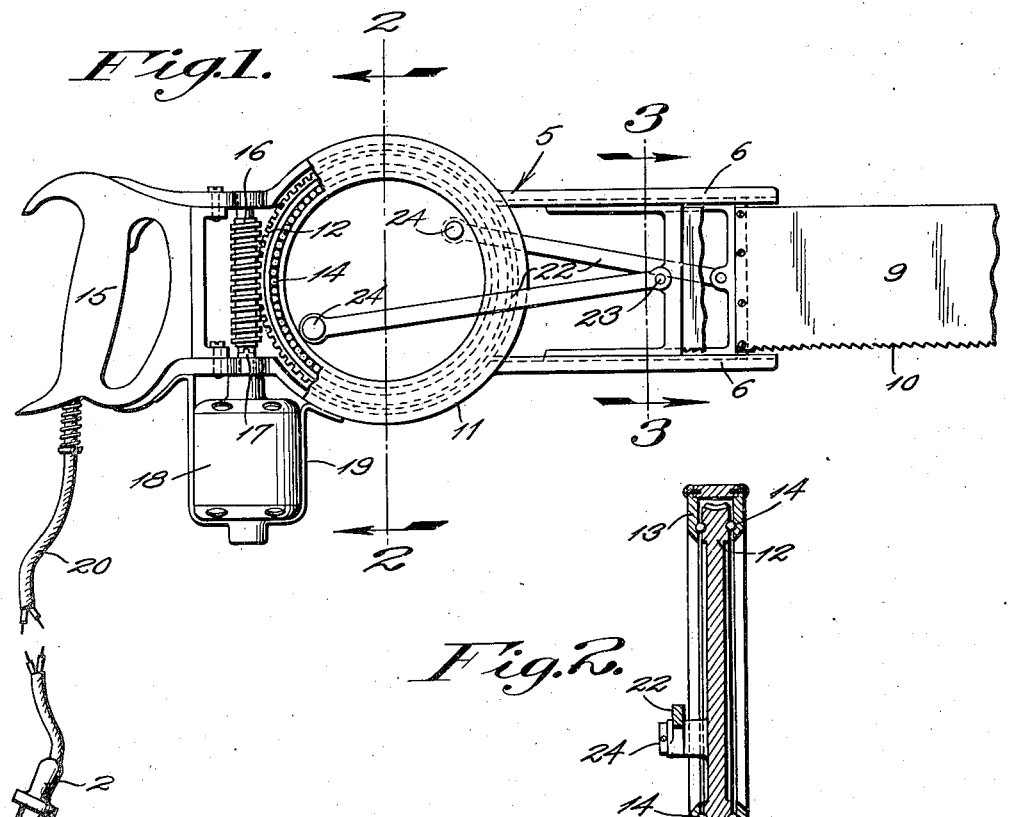
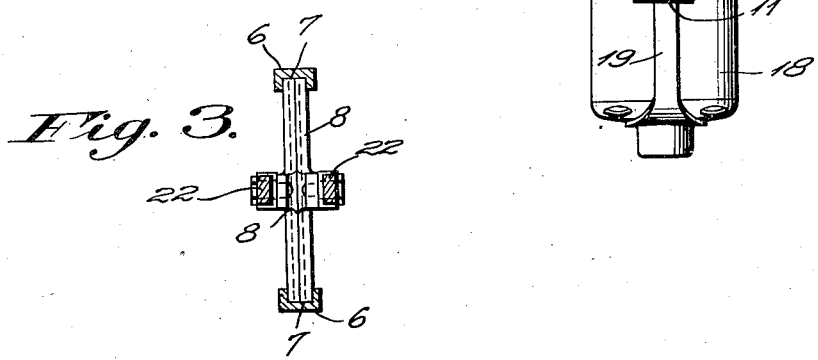
Cyrus M. MacLeod
INVENTOR
BY Victor J. Evans & Co.
ATTORNEY
WITNESS Patented Dec. 15, 1936

2,064,676

UNITED STATES PATENT OFFICE 2,064,676

ELECTRIC HAND SAW

Cyrus M. MacLeod, Waverley, Mass.

Application June 4, 1935, Serial No. 24,965

1 Claim. (Cl. 143—68)

The invention relates to a hand saw and more especially to an electric motor driven portable hand saw.

The primary object of the invention is the provision of a saw of this character, wherein through the instrumentality of two blades and the reciprocation of these a piece of work can be cut as a continuous sawing action is had thereon, these blades being driven from an electric motor carried by the handle of the saw and in this manner the work can be sawed with dispatch, the means for reciprocating the blades of the saw being held in a novel manner.

Another object of the invention is the provision of a saw of this character, wherein the moving blades eliminate resistance to the cutting action thereof under reciprocation and such blades are reciprocated by motive power, the saw being readily portable and can be conveniently handled when in operation upon a piece of work.

A further object of the invention is the provision of a saw of this character, which is simple in construction, thoroughly reliable and efficient in operation, readily and easily handled, having quick cutting action and a continuous cut being had when operating, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary side elevation of a saw constructed in accordance with the invention and being partly in section.

Figure 2 is an enlarged vertical transverse sectional view taken on the line 2—2 of Figure 1 looking in the direction of the arrows.

Figure 3 is a sectional view on the line 3—3 of Figure 1 looking in the direction of the arrows.

Similar reference characters indicate corresponding parts throughout the several views in the drawing.

Referring to the drawing in detail, the saw constituting the present invention comprises a handle stock which is in the form of an open frame 5 having spaced parallel guide rails 6 providing channeled tracks 7 therein in which operate cross heads 8, these having fixed thereto the blades 9, the teeth 10 of one blade being reversely inclined in cutting position to the teeth of the other blade so that when these blades are reciprocated a continuous cutting operation will be had, that is, each blade upon one of its strokes will cut into the work while on its second stroke will idle over the work.

The frame has formed therewith a circular portion 11 for accommodating therein a worm gear 12. Fastened to this circular portion 11 at opposite sides thereof are cheek rings 13 between which and the said gear 12 are interposed bearing balls 14, these working in channels or raceways provided in said rings and gear and in this manner the gear 12 is held in place and centered within the portion 11 of the frame.

The frame at the end thereof remote from the blades 9 is formed with or has attached thereto a handle 15 while journaled in the frame next to the gear 12 is a worm screw 16 meshing with the said gear 12 and is associated with the driving shaft 17 of an electric motor 18 the latter being confined or held in place by a bracket 19 for the mounting thereof upon the frame. The motor 18 has connected therewith the current conductor cable or cord 20 of standard kind and this cord has a terminal separable plug 21 for joining it with a current supply.

Eccentrically connected with the gear 12 at opposite sides thereof and diametrically opposite are throw rods or pitmans 22, these being pivoted at 23 to the cross heads intermediate thereof and pivoted at 24 to the said gear 12 so that when the gear is rotated reciprocatory movement will be imparted to the blades 9 and by reason of the set of the teeth 10 of these blades a continuous cutting operation can be had. By reason of the disposition of the blades side by side when engaged with a piece of work a resistance in the cutting operation by the blade is reduced to a minimum and as should be apparent from Figure 1 of the drawing a continuous cutting action is had when the motor 18 is active. This motor is a driving power for the gear 12.

The rings 13 with the open centers expose the gear 12 and the pivotal connection of the throw rods or pitmans 22 with this gear will not be interfered with by the said rings so that a perfect working of the saw is assured.

The saw in the construction thereof is readily portable and assures cutting action with dispatch, the cutting action being continuous under the reciprocation of the blades 9.

What is claimed is:

The herein described construction of motor operated saws characterized by an open frame having arm extensions at one end to be fixed to the handle for the saw and carrying a bracket for supporting the drive motor, said frame having a circular portion and parallel ring flanges carried by said circular portion and having annular grooves on their inside faces, a gear wheel between the flanges and having annular grooves co-operating with the flange groove to receive anti-frictional balls, and a pair of spaced parallel grooved guide flanges extending from said circular portion to afford guides for saw-carrying crossheads which have pitmans connected to the opposite faces of the gear wheel, together with a worm on the armature shaft of the motor finding bearings in the mentioned arms of the frame and engaging the teeth of the gear.

CYRUS M. MacLEOD.